United States Patent Office 3,183,171
Patented May 11, 1965

3,183,171
PROCESS FOR CONTROLLING THE GROWTH
RATE OF FUNGI
Heinz R. Schreiner, Tonawanda, N.Y., assignor to Union
Carbide Corporation, a corporation of New York
No Drawing. Filed July 24, 1962, Ser. No. 212,149
7 Claims. (Cl. 195—81)

This invention relates to a method for controlling the growth rate of fungi. More particularly the invention is directed to a process for controlling the growth rate of fungi by contacting such fungi with gaseous atmospheres containing chemically inert gases.

Fungi are organisms which do not contain chlorophyl and which obtain food and energy either saprophytically by breaking down organic matter in dead plant and animal bodies or parasitically by infecting living organisms. Many fungi are beneficial to man. For example, the ergot fungus produces important pharmaceutical alkaloids; yeasts are important in the baking and brewing industries; citric acid and other organic acids are manufactured with the aid of fungi; and fungi are employed in the production of certain drugs and vitamins. Many other fungi are undesirable and are responsible for a wide variety of plant diseases as well as some diseases that affect animals and man; and, in addition, destroy fabrics and stored foodstuffs.

It is an object of this invention to provide a method for controlling the growth rate of fungi. Another object of this invention is to provide processes by which the growth rate of desirable fungi can be accelerated and by which the growth rate of undesirable fungi can be retarded. A still further object of this invention is to provide a method by which a fungus can be grown at a predetermined rate by selecting the composition of the atmosphere in contact with the fungus. These and other objects and advantages of this invention will be apparent from the following description and appended claims.

According to the process of this invention, the fungus whose growth rate is to be controlled is contacted with a gaseous atmosphere which comprises (1) at least the minimum concentrations of oxygen and water vapor required to support growth of the fungus, (2) an inert gas in an amount corresponding to a mole fraction between about 0.3 and about 0.95, and (3) and balance gases which do not exert any significant influence on the growth rate of fungi relative to air or nitrogen-oxygen mixtures. The minimum oxygen and water vapor concentrations vary depending on the particular fungus, and the determination of minimum concentrations is well understood by those familiar with the properties of fungi.

The inert gases which are useful in the process of the present invention are the monatomic noble gases and include helium, neon, argon, krypton and xenon.

The components of the gaseous atmosphere which do not exert any significant influence on the growth rate of fungi include, for example, nitrogen, carbon dioxide and other gases (other than the inert gases described above) at the concentrations which are normally present in the earth's atmosphere, for example, hydrogen and carbon monoxide. A typical gaseous atmosphere of the invention can contain, for example, (1) oxygen, mole fraction 0.05, (2) helium, mole fraction 0.90, (3) water vapor, mole fraction 0.045 and (4) carbon dioxide, mole fraction 0.005.

The mole fractions defined and computed herein are based on the ideal gas law. That is, it is assumed that all gaseous components of the atmospheres useful in this invention are ideal gases.

The gaseous atmospheres of this invention can contain a single inert gas or a mixture of two or more of the operable inert gases, provided that the total mole fractions of the inert gas (that is the sum of the mole fractions of the individual inert gases) is between about 0.3 and about 0.95.

It has been found that the inert gas helium is in general a growth accelerator while the inert gases krypton and xenon are in general growth inhibitors relative to air or relative to nitrogen-oxygen mixtures.

When a maximum growth rate for the fungus is desired, in addition to employing a growth accelerating inert gas or gas mixture, the temperature and the concentrations of oxygen and water vapor must be carefully controlled.

For maximum growth, the temperature of the fungus and of the gaseous atmosphere in contact with the fungus should be maintained in the range between about 20° C. to about 35° C.

The oxygen concentration for maximum growth should be maintained somewhat above the minimum level necessary to support fungus growth, typically at a concentration corresponding to a mole fraction between about 0.04 and about 0.1.

Also, for maximum growth rate, the water vapor concentration should be maintained at a mole fraction corresponding to 60–100% relative humidity for the particular gaseous atmosphere employed. (The percentage relative humidity is defined as the quotient of the partial pressure of water vapor at any temperature divided by the vapor pressure of water at the same temperature.)

When retardation of the fungus growth rate is desired, one of the growth inhibiting gases or gas mixtures is employed and the conditions for optimum fungus growth, described hereinabove, need not be provided.

The process of the invention is broadly applicable to controlling the growth rate of all fungi, including for example: molds, such as *Penicillum notatum*, *Neurospora crassa*, *Aspergillus niger*, *Trichoderma viride*, and *Rhizopus oryzae*; mildews, such as *Chaemotium globosum* and *Metarrhizium*; yeasts, such as *Saccharomyces cerevisiae*, and *Saccharomyces carlbergensis*; rusts, such as *Puccinia graminis*; smuts, such as *Ustilago zeae* and *Ustilago kolleri*; mushrooms, such as *Agaricus campestris* (champignon), and *Coprinus comatus* (horsetail mushroom), and the like.

The growth rate of fungi in the growth-controlling atmospheres of this invention can be expressed by the linear relationship (A) $$R = b - k\sqrt{M}$$

wherein R is the growth rate of the fungus, M is the atomic weight of the inert gas or the weighed average atomic weight of the inert gas mixture and $b$ and $k$ are parameters which are constant for a particular fungus at a given temperature, pressure and concentration of the components in the growth controlling atmosphere. By way of illustration, the weighed average atomic weight of an inert gas mixture containing 60 mole percent helium and 40 mole percent neon is $$\frac{60 \times 4.0 + 40 \times 20.2}{100} = 10.48$$

The relationship of Equation A makes it possible to "tailor-make" a growth-controlling atmosphere of this invention in order to provide a particular predetermined growth rate for the fungus. Once the parameters $b$ and $k$ have been determined for a fungus under a given set of environmental conditions, a desired growth rate R can be provided by mixing inert gases in the proportions which give the weighed average atomic weight M which corresponds to the desired rate R.

When acceleration of fungus growth is desired, helium should be present in the growth controlling atmospheres of this invention at a mole fraction of at least about 0.6 and preferably a mole fraction of at least about 0.9. Below a mole fraction of about 0.6 helium does not exhibit significant growth accelerating properties relative to air or nitrogen-oxygen mixtures.

The fungus growth retarding inert gases useful in the process of this invention exhibit growth retarding properties relative to air or nitrogen-oxygen mixtures at mole fractions as low as about 0.3. When maximum growth retardation is desired, xenon is used as the growth-controlling inert gas at a mole fraction of at least about 0.9.

Although the growth-controlling atmospheres useful in this invention can significantly retard the growth rate of a fungus, fungus growth is not completely arrested.

The total pressure of the gaseous atmosphere in contact with the growing fungus exerts a relatively small influence on the growth rate, and no significant advantage is obtained by the use of total pressures above or below atmospheric pressure.

The process of this invention is particularly useful where surface cultures of fungi are used in the commercial production of useful products. For example, surface cultures of the mold *Aspergillus niger* are used in the manufacture of citric acid and the growth of this mold can be conveniently accelerated by the process of this invention.

The growth of edible fungi, such as mushrooms, can also be accelerated by means of the process of this invention.

The process of this invention can also be used to retard the growth of undesirable fungi as in grain storage and food packaging. The gaseous atmospheres of the present invention retard the growth of undesirable fungi and at the same time contain sufficient oxygen to prevent growth of undesirable anerobic bacteria.

The fungus whose growth is to be controlled can be contacted with the growth-controlling atmospheres of this invention by any convenient method. When optimum growth is desired and the temperature and the concentrations of the components of the atmposphere must be carefully controlled, conventional gas flow controls, meters, temperature regulators and the like can be used. When growth inhibition is desired, it is often sufficient to seal the fungus in a container in which the atmosphere comprises one of the growth inhibiting atmosphere described above at an inert gas mole fraction of between about 0.3 and about 0.95.

The process of the invention is illustrated by the following description of experiments wherein the growth rate of a typical fungus was accelerated or retarded over a wide range by contacting the fungus with a variety of growth controlling atmospheres.

Experimental studies were carried out in a controlled atmosphere incubator. The incubator provided a sealed system, helium-leak-tight, and capable of confining an experimental gas mixture for a minimum of two weeks without significant loss. The gas atmosphere was circulated over the fungus by means of a solenoid-activated diaphragm pump. Carbon dioxide partial pressure was maintained below 3 mm. Hg by continuously passing the gas stream through a stripping column of one normal potassium carbonate solution which removed the $CO_2$ produced by the organism. The stripping column also served to maintain the relative humidity of the gas atmosphere near 100% independent of system pressure and temperature. Supplementary humidification was provided by a water reservoir in contact with the gas stream. The carbon dioxide removed was replaced by make-up oxygen which was automatically reblended into the gas stream on a stoichiometric basis by a pressure-sensitive servomechanism. Incubation temperature was maintained constant within 0.5° C. at levels above or below ambient temperature by control of the temperature in the enclosure surrounding the sealed system. Operation above ambient temperature can be achieved by use of an electric heater in the outlet of the blower which circulated the enclosure air, while operation below ambient temperature can be accomplished by controlled injection of cold nitrogen gas.

An investigation of the growth rate of the red bread mold *Neurospora crassa* 5297a (the designation "5297a" refers to a particular strain of *N. crassa* in the listings of the American Type Culture Collection, Washington, D.C.) at a temperature of 30° C. and a system pressure of 760 mm. Hg, in various gaseous environments was made. Growth rates were determined by the tube method of Ryan et al. as described in Am. J. Botany, 30, 784 (1943). This technique involves measuring the progression of mycelial frontiers within horizontal glass tubes half filled with suitable solid culture media. In the experiments conducted, the mold was allowed to grow across the surface of 15 ml. solidified minimal medium [described by Nicholas et al. in J. Biol. Chem., 207, 341 (1954)], in glass tubes 40 cm. in length with an internal diameter of 13 mm. Sucrose and sodium nitrate were employed as sources of carbon and nitrogen, respectively.

The experimental technique employed involved pipetting 15 milliliters of hot, sterile nutrient medium into each of eight growth tubes and, after cooling and solidification, inoculating each tube with a single drop of a water suspension of *N. crassa* spores. The growth tubes were then connected to gas distribution manifolds which were joined to the gas circulation system of the incubator. The inoculation was made in such a way that the mold grew against the direction of gas flow (an expedient well known to those versed in the art) so as to eliminate the possibility of spores being projected ahead of the advancing mycelium front and causing the growth of irregular patches of mold.

After inoculation with the spore suspension, there was an initial period, termed the lag phase, in which no growth of the mold could be observed. This lag phase provides for the intake of moisture and nutrients into the spores and is analogous to the period during which a seed lies dormant in the soil prior to germination. The lag phase involves a period of from 7 to 16 hours for *N. crassa* and has not been found to be affected in any statistically significant manner by the nature of the gaseous environment to which the mold is exposed. At the end of this period, a constant growth rate was established and maintained throughout a period of some 100 hours during which observations were made.

EXAMPLE 1

Experiments were conducted on the fungus *N. crassa* 5297a by the above described technique with atmospheres containing five different growth-controlling gases under the following conditions of temperature, pressure and atmosphere composition:

Temperature=30° C.
Total pressure=760 mm. Hg

| Atmosphere composition | Mole fraction | Partial pressure, mm. Hg |
|---|---|---|
| Inert gas | 0.907 | 689 |
| Oxygen | 0.047 | 36 |
| Water vapor | 0.042 | 32 |
| Carbon dioxide | 0.004 | 3 |

The experimental results are summarized in Table I.

*Table I*

| Inert gas | Number of observations | Average lag phase (hrs.) | Average growth rate, mm./hr. |
|---|---|---|---|
| Helium | 5 | 11 | 3.51 |
| Neon | 6 | 12 | 3.14 |
| Argon | 10 | 13 | 2.73 |
| Krypton | 11 | 13 | 2.22 |
| Xenon | 12 | 12 | 1.86 |

For the particular fungus, temperature, total pressure and atmosphere composition employed in Example 1, the values of the parameters $b$ and $k$ in Equation A can be determined by conventional methods, namely from a graph of the average growth rates from Table I as a function of the square root of the atomic weight of the inert gas. The resulting equation is (B)  $R = 3.88 - 0.1785\sqrt{M}$ Example 1 also illustrates the wide range over which fungus growth rates can be regulated by means of the process of this invention.

EXAMPLE 2

Following the same experimental technique as in Example 1, the process of this invention was used to control the growth of the fungus *N. crassa* 5297a under the following conditions:

Temperature = 30° C.
Total pressure = 760 mm. Hg

Atmosphere composition:      Partial pressure, mm. Hg
  Inert gas mixture _____ 666 to 675
  Oxygen _____ 50 to 59
  Water vapor _____ 32
  Carbon dioxide _____ 3

The experimental results are summarized in Table II.

*Table II*

| Partial pressure of gaseous constituent in mm. Hg | | | Total inert gas mole fraction | Number of observations | Average growth rate in mm./hr. | |
|---|---|---|---|---|---|---|
| Helium | Xenon | Oxygen | | | Observed | Predicted |
| 483 | 183 | 59 | 0.876 | 5 | 2.84 | 2.78 |
| 330 | 345 | 50 | 0.888 | 5 | 2.43 | 2.41 |
| 134 | 535 | 56 | 0.875 | 5 | 2.15 | 2.07 |

The predicted growth rates in Table II were obtained by the use of Equation B from Example 1 by substituting for M the weighted average atomic weight of the inert gas mixtures of Example 2. Equation B gives very accurate predictions for the growth rates of Example 2 since the total inert gas and oxygen mole fractions, as well as other environmental conditions of the fungus, were approximately the same in Examples 1 and 2.

The data of Example 2 illustrate how the process of this invention can be used to obtain any desired growth rate for a particular fungus. Thus, once an equation such as Equation B is determined for a particular fungus, any desired growth rate can be obtained by selecting an inert gas mixture (of any two or more inert gases) having the proper weighted average atomic weight corresponding to this growth rate.

EXAMPLE 3

Following the same experimental technique as in Example 1, the process of this invention was used to control the growth of the fungus *N. crassa* 5297a under the following conditions:

Temperature = 30° C.
Total pressure = 760 mm. Hg

| Atmosphere composition | Mole fraction | Partial pressure, mm./Hg. |
|---|---|---|
| Inert gas | 0.477 | 363 |
| Oxygen | 0.477 | 362 |
| Water vapor | 0.042 | 32 |
| Carbon dioxide | 0.004 | 3 |

The results are summarized in Table III.

*Table III*

| Inert gas | Number of observations | Average growth rate in mm./hr. |
|---|---|---|
| Helium | 5 | 2.98 |
| Xenon | 10 | 2.28 |

The above results demonstrate that the process of this invention can be used to regulate fungus growth rate over a considerable range even in the presence of relatively high oxygen concentrations.

EXAMPLE 4

The following growth rate tests were carried out on the fungus *N. crassa* 5297a by the experimental technique of Example 1, but gaseous atmospheres not included within the process of the present invention were used. The test conditions were as follows:

Temperature = 30° C.
Total pressure = 760 mm. Hg
Water vapor partial pressure = 32 mm. Hg
Carbon dioxide partial pressure = 3 mm. Hg
Air or nitrogen-oxygen mixture partial pressure = 725 mm. Hg The results are summarized in Table IV.

*Table IV*

| Partial pressure of $O_2$ and $N_2$ constituents in mm. Hg | | Nitrogen mole fraction | Number of observations | Average growth rate in mm./hr. |
|---|---|---|---|---|
| Nitrogen | Oxygen | | | |
| 689 | 36 | 0.907 | 9 | 2.93 |
| 558 | [1] 167 | 0.735 | 7 | 3.16 |
| 363 | 362 | 0.477 | 10 | 3.05 |

[1] Dry air was used as the $N_2$-$O_2$ mixture and the partial pressures are approximate, no allowance being made for minor constituents in atmospheric air.

The results summarized in Table IV show that in contrast to the gaseous atmospheres of the process of this invention, atmospheric air or other nitrogen-oxygen mixtures have very limited effects on the growth rates of fungi. The growth rate range of 2.93 to 3.16 mm./hr. of Example 4 is small in comparison to the range of growth rates of 1.86 to 3.51 mm./hr. shown in Example 1.

Comparison of the first entry in Table I with the first and second entries in Table IV demonstrates how the use of helium in the process of this invention greatly increases the growth rate of fungi over the rate in air or in high nitrogen-low oxygen atmospheres.

What is claimed is:
1. A process for controlling the growth rate of a fungus which comprises contacting a growing fungus with a gaseous atmosphere comprising (1) oxygen at a mole fraction greater than the minimum necessary to support growth of said fungus, (2) water vapor at a mole fraction greater than the minimum necessary to support growth of said fungus, (3) at least one inert gas selected from the class consisting of helium, neon, argon, krypton and xenon at a total inert gas mole fraction of between about 0.3 and about 0.95, and (4) the balance consisting essentially of gases which do not exert any significant influence on the growth rate of said fungus selected from the group consisting of nitrogen, carbon dioxide, hydrogen and carbon monoxide.

2. Process in accordance with claim 1 wherein said inert gas is helium.

3. Process in accordance with claim 1 wherein said inert gas is a mixture of helium and xenon.

4. A process for accelerating the growth rate of a fungus which comprises contacting a growing fungus with a gaseous atmosphere consisting essentially of (1) oxygen at a mole fraction greater than the minimum necessary to support growth of said fungus, (2) water vapor at a mole fraction greater than the minimum necessary to support growth of said fungus, (3) helium at a mole fraction of between about 0.6 and 0.95, (4) carbon dioxide at a mole fraction of up to 0.005, and (5) the balance nitrogen.

5. A process for retarding the growth rate of a fungus which comprises contacting a growing fungus with a gaseous atmosphere consisting essentially of (1) oxygen at a mole fraction greater than the minimum necessary to support growth of said fungus, (2) water vapor at a mole fraction greater than the minimum necessary to support growth of said fungus, and (3) xenon at a mole fraction of between about 0.3 and about 0.95, and (4) the balance at least one gas selected from the class consisting of carbon dioxide and nitrogen.

6. A process for accelerating the growth rate of a fungus which comprises contacting a growing fungus with a gaseous atmosphere consisting essentially of (1) oxygen at a mole fraction of about 0.047, (2) water vapor at a mole fraction of about 0.042, (3) helium at a mole fraction of about 0.907, and (4) carbon dioxide at a mole fraction of about 0.004, while maintaining said fungus and said atmosphere at a temperature of about 30° C.

7. A process for accelerating the growth rate of the fungus *Neurospora crassa* which comprises contacting said growing fungus with a gaseous atmosphere consisting essentially of (1) oxygen at a mole fraction of about 0.047, (2) water vapor at a mole fraction of about 0.042, (3) helium at a mole fraction of about 0.907, and (4) carbon dioxide at a mole fraction of about 0.004, while maintaining said fungus and said atmosphere at a temperature of about 30° C.

References Cited by the Examiner

UNITED STATES PATENTS 2,923,629  2/60  Bonomi _____ 99—103

OTHER REFERENCES

Porter: Bacterial Chemistry and Physiology, John Wiley and Sons, Inc., New York, 1946, pages 630–635.

A. LOUIS MONACELL, *Primary Examiner.*

ABRAHAM H. WINKELSTEIN, *Examiner.*